July 11, 1961 — J. LAMAZOU ET AL — 2,991,909
SINGLE SEED SOWING MACHINE
Filed Feb. 21, 1957 — 4 Sheets-Sheet 1
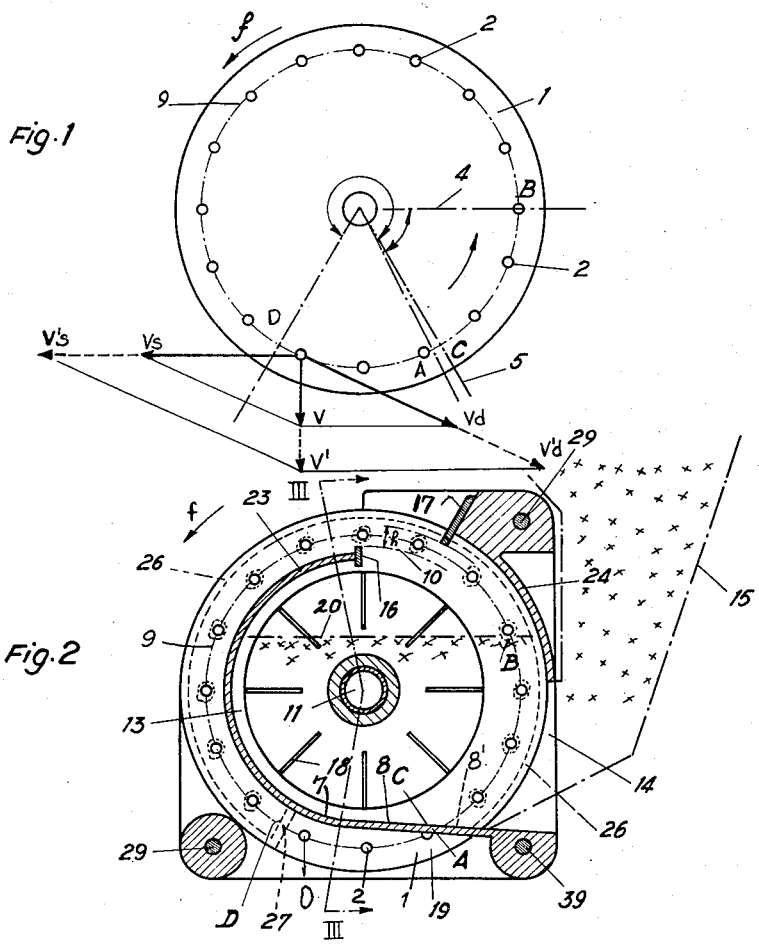
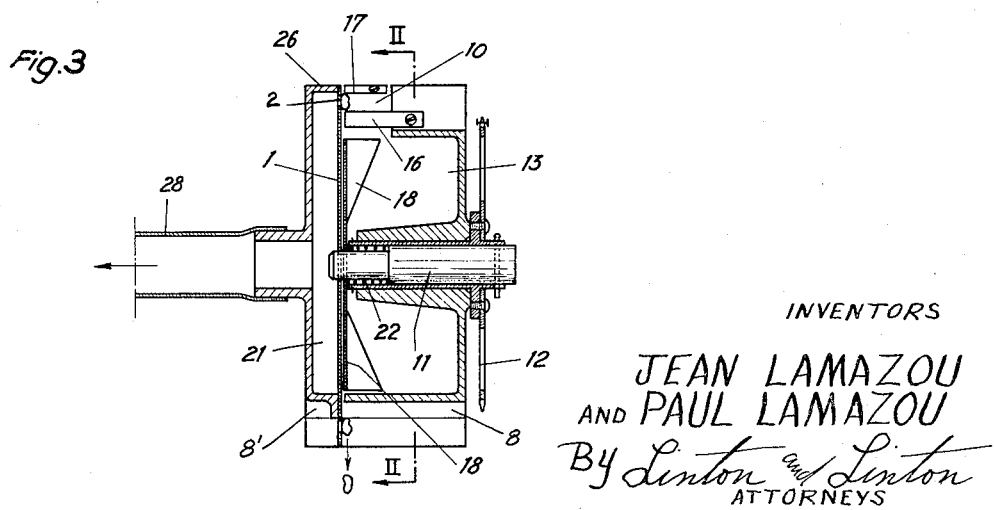
INVENTORS
JEAN LAMAZOU
AND PAUL LAMAZOU
By Linton and Linton
ATTORNEYS

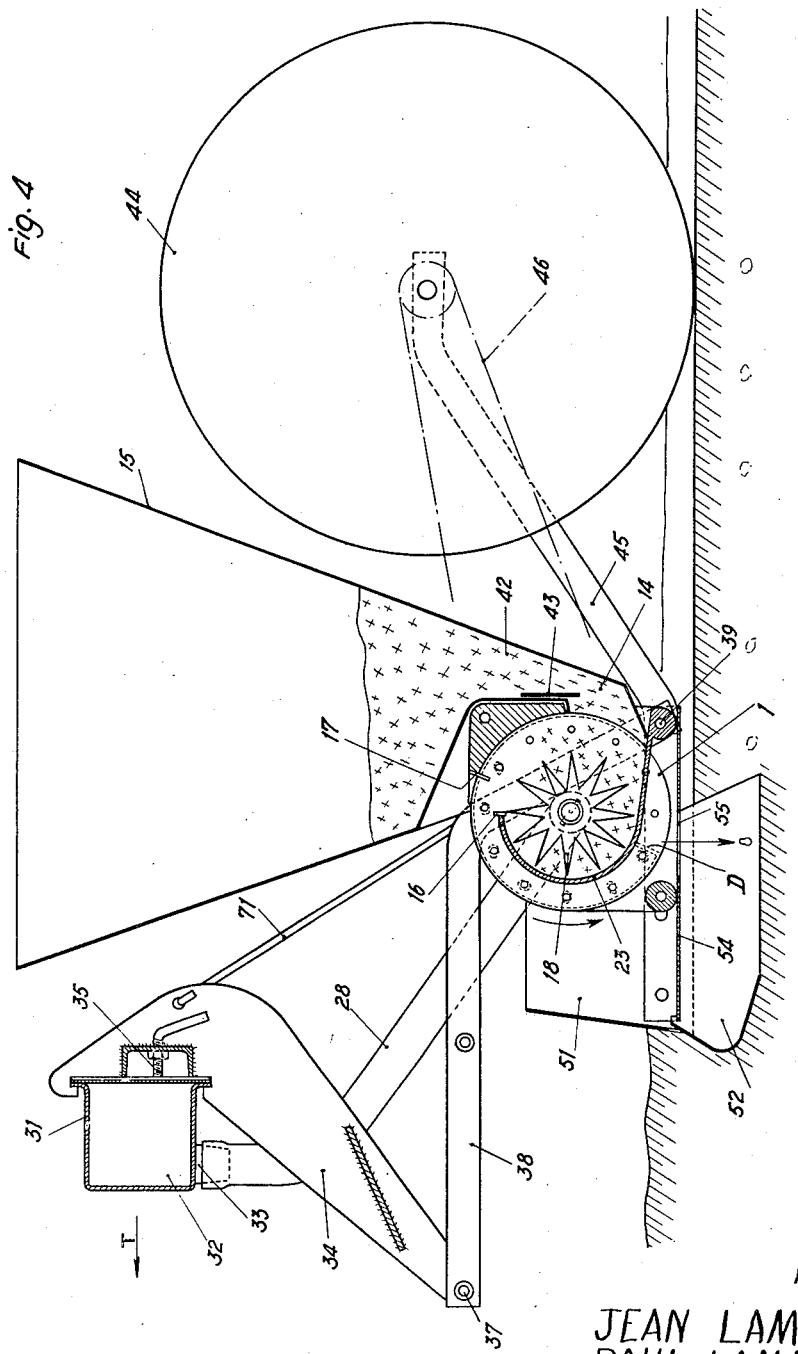

INVENTORS
JEAN LAMAZOU
AND PAUL LAMAZOU
By Linton and Linton
ATTORNEYS

United States Patent Office 2,991,909
Patented July 11, 1961

2,991,909
SINGLE SEED SOWING MACHINE
Jean Lamazou and Paul Lamazou, both of 4bis Rue des Anglais, Pau, France
Filed Feb. 21, 1957, Ser. No. 641,660
Claims priority, application France July 17, 1956
3 Claims. (Cl. 221—211)

The present invention relates to a single seed sowing machine of a simple structure and with an accurate operation, which ensures a highly uniform sowing, as regards both number and spacing of the seeds, whatever may be the shapes and weights thereof. In particular, the sowing machine according to the invention may be used, equally well for various kinds of seeds such as for maize, beets, beans, peas and the like and makes it possible to carry out all sowings in lines thereof.

According to the invention, the sowing machine is chiefly characterized in that the seed distributing element is constituted by a substantially vertical rotating disc with a circular row of perforations with said perforations each having dimensions smaller than that of the seeds to be sown. One face of said disc serving as a wall for an enclosure hereinafter called a seed box containing the seeds to be sown and the other face serving as a wall for an enclosure hereinafter called a suction box which is in communication with means for forming suction therein. The relative dispositions of the two enclosures being such that the arcs they intercept on the row of perforations of said disc offer a common portion but are offset angularly and the arc within said suction box extends in the direction of rotation of said disc, farther than the arc within said seed box.

Said seed box is in communication with a hopper containing the seeds. The suction box is connected with a suction pump or the like.

Under such conditions, the seeds, at the level of the seed box are pressed against the perforations at the rate of one seed per perforation, by the suction of air therethrough, and they are held in that position as long as they are at the level of the suction box. As soon as the rotation of the disc has carried them beyond the latter, the seeds fall under the action of their own weight.

Adjustable paddles, in addition, are suitably provided for limiting the free run on both sides of the perforations. Under such conditions, the sowing may be made strictly "single seed."

Of course the perforated disc is preferably interchangeable which makes it possible to use a set of discs offering perforations with different dimensions and spacings.

Other features of the invention will appear, in addition, from the description which follows.

In the accompanying drawings, given by way of non limitative examples:

FIGURE 1 is an explanatory diagram of the operation of a seed distributor belonging to a sowing machine according to the invention and which illustrates the combination of speeds of a seed dropping from the machine.

FIGURE 2 is a vertical section taken in line II—II of FIGURE 3.

FIGURE 3 is an axial section of the same distributor taken on line III—III of FIG. 2.

FIGURE 4 is a side elevation, partially in section, of a sowing machine according to the invention.

Figure 5:
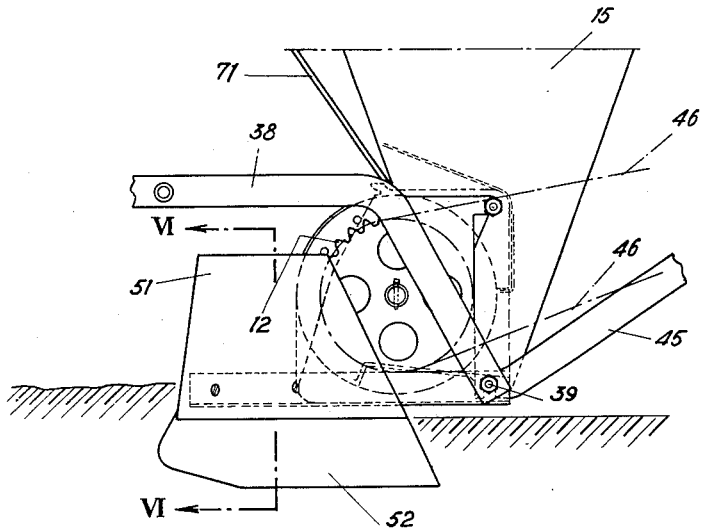
FIGURE 5 is a side elevation of the assembly of the distributor and associated members.

The seed distributor according to the invention comprises essentially (FIGURE 1) a substantially vertical disc 1, capable of pivoting in the $f$ direction, by means of any suitable means. This disc has a circular series of regularly spaced perforations 2, the diameters of each of which are smaller than the smallest dimensions of the seeds to be sown.

This disc acts as a common wall for two enclosures, not shown, one of which, the so-called seed box is filled with seeds, and its walls, shown at 3 and 4 intercept, in the circular row 9 of perforations, 2, an arc AB.

The other enclosure, or section box is limited by walls 5 and 6 which intercept an arc CD. The wall 5 is located within the arc AB, the wall 6 being beyond the wall 4 in the direction $f$.

Under such conditions, since, on arc CB the perforations 2 are located between the seed box and the suction box, the seeds are attracted against these perforations and are held thereagainst by suction. They remain attached there all along the arc BD, and as soon as wall 6 has been passed, the attraction due to the suction ceases and the seeds fall by gravity.

The suction force and the dimensions of perforations are so provided that, in principle, it is impossible for two seeds to be held simultaneously against the same perforation.

In a practical embodiment of the distributor (FIGS. 2 and 3), the disc 1 is mounted on a horizontal shaft 11 driven by a gear wheel 12. The seed box 13, which is in communication through an aperture 14 with a hopper 15 containing the seeds to be sown, is limited by a wall 23 in contact with the disc 1. The contour of said wall comprises an arc of a smaller radius than that of the circular row 9. The wall 23 is continued in its lower part 7 by a tangential projection 8 which traverses said row 9 at A and thus constitutes the wall 3 of FIG. 1. Said seed box further has a second wall 24 having a bigger radius than the row 9 and is positioned before the wall 23 relative to the direction of rotation of disc 1.

The walls 23 and 24 are then spaced apart and provide a free passage 10 in the upper portion of the box for seeds on said disc. The arc AB of FIG. 1 thus extends between the projection 8 and the upper level 20 of the seeds which is below the passage 10 as seen on FIG. 2. Paddles 16, 17, which are adjustable in height, make it possible to set the height $h$ of this passage 10. Inside the box 13 there is also a paddle type stirrer 18 associated with the disc 1. The latter is applied, further, against the suction box 21, by a spring 22 so as to ensure as tight a contact as possible with the wall 26 of this box.

The suction box 21 is in communication with means for producing suction therein through an axial outlet 28. Said box is limited by a wall 26 is contact with the disc 1 and having a continuous contour including a circular arc having a bigger radius than that of row 9. Said arc of wall 26 extends around the periphery of disc 1 except in the lower portion 19 of the same, where it is connected with a radial section 27 traversing the row of perforations at D and continued by a projection 8′ symmetric with the projection 8 of the seed box relating to the disc 1.

The arc of row 9 thus intercepted by the suction box 21 extends in the direction $f$ from C which is at the same position as A, to D close to the lower portion 19 of disc 1.

The projection 8′ and the section 27 thus constitute respectively the walls 5 and 6 of FIG. 1.

The assembly of boxes 13 and 21 is consolidated by screw threaded rods such as 29 or 39.

The operation of the distributor is as follows: The seeds stirred by the stirrer 18 press against perforations 2, with the paddles 16 and 17 causing the falling off of duplicate seeds which might have been carried along. The seeds are held by the suction until D and as soon as the wall 27 has been passed they fall by gravity. The operation of the distributor is thus both simple and reliable.

In the embodiments of FIGURES 4 and 5 the above distributor is combined with various elements so as to constitute a sowing machine in line.

To that effect, one or more sowing units identical with the unit represented, and arranged parallel to one another at the required spacing, are attached to a traction bar 51 connected with the tractor (not shown) and arranged at right angles to the direction of displacement T thereof.

The bar 31 is hollow and constitutes a general suction conduit 32.

Conduit 32 is connected with a source for producing suction therein, not shown, which may consist either of a suction pump driven by an independent motor, or of a suction member actuated from the power take off on the motor through a free wheel and flywheel transmission which makes it possible to ensure the rotation of the suction element even during periods in which the motor is clutched out.

The conduit 32 is further provided with tubings 33, their number corresponding to that of the sowing elements, and to which are secured the suction hoses 28 each one of which leads to a box 21.

The connection between the bar 31 and each one of the seed distributors is ensured by a fork 34 capable of sliding along the bar 31 and of being fastened by clamping elements 35 which makes it possible to adjust the spacing of the lines of sowing. On each fork 34, a movable fork 38 is articulated, the other end of which is articulated at 39 to the sowing unit which comprises in a consolidated assembly, the seed distributor similar to that of FIGURES 2 and 3, the hopper 15, the spout of which 42 is provided with an adjustable shutter 43 which allows setting the height of the seeds in the chamber 13, a wheel 44 carried by a fork 45, which drives through a roller chain, 46, the pinion 12 (FIG. 5) and finally an assembly of two V shaped ploughshares, with unequal apertures 51, 52.

Figure 6:
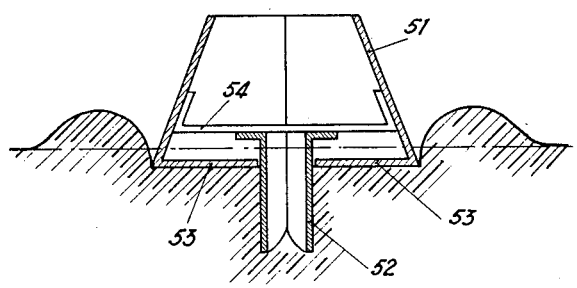
FIGURE 6 is a cross section of the plough shares taken on line VI—VI in FIGURE 5.
Figure 7:
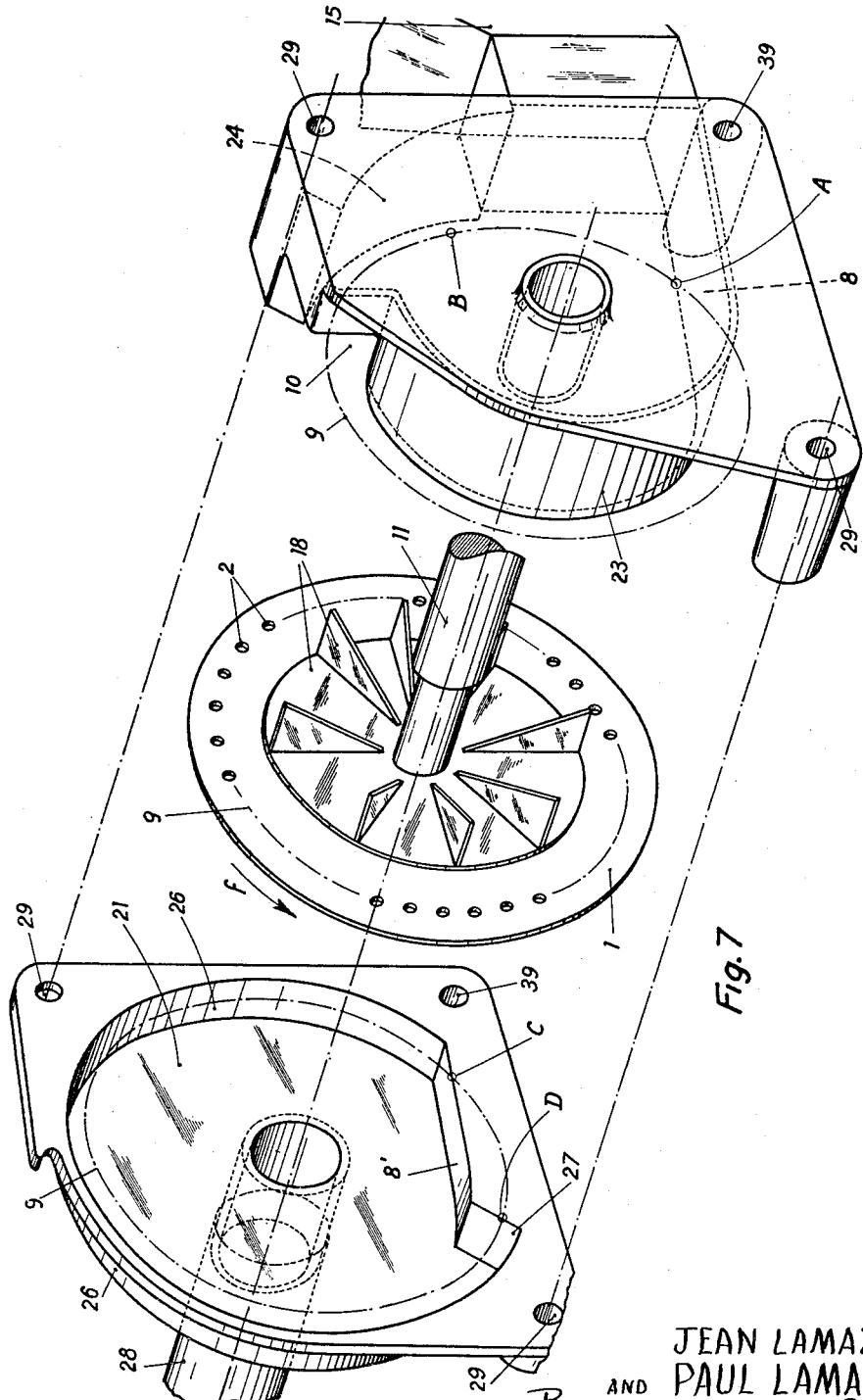
FIGURE 7 is an exploded perspective view of the seed distributor.

These ploughshares are interlocked, the first one being folded at its lower portion along two shoes 53 (FIG. 6). These two ploughshares have the same plane of longitudinal symmetry and the ploughshare 52 is secured to the ploughshare 51 through a plate 54 perforated at 55 in register with point D where the seeds escape.

The operation is easily understood, the assembly being pulled in direction T.

The ploughshare 51 or depth adjusting ploughshare, digs a furrow, throwing the earth back at 61 on both sides. The inner ploughshare 52 or sowing ploughshare digs a new and very narrow furrow, inside which the seeds fall, between the two walls of the ploughshare. The furrow closes by itself over the seed as soon as the ploughshare has passed beyond it. Since the body of the sowing element is articulated at 59, it can swing about said axle and the ploughshare 51 follows the undulations of the ground. The sowing is thus always carried out at a constant depth, which is very important for germination.

The wheel 44 ensures the driving of the disc 1. As, in addition, it is located on the axis of the ploughshare 52, it causes the tamping of the earth above the seeds.

For road transportation, wheels may be adapted at the ends of the bar 31, the body of the sowing machine being then supported by a rod 71.

The device according to the invention offers numerous advantages, some of which are indicated hereinafter.

The distribution of the seeds on the ground, i.e. the relative spacing of the seeds, is very uniform. This result can be explained in the following manner:

The arc C, 10, D on the row 9 of apertures 2 of the disc 1 correspoding to the suction box 21 extends down to the vicinity of the lowest point of said disc at partition 27, FIG. 2. At this point, aspiration ceases, and the seeds are released.

The distributor is at the lowest part of the casing of the machine, and consequently seeds are released at a very short distance from the ground. As the height of fall is small, the duration of fall is very short.

On the other hand, as the seeds fall naturally, by gravity, their initial speed V is the resultant of the forward speed $V_s$ of the vehicle and the backward speed $V_d$ of the apertures 2 near their lowest position (FIG. 1) with $V_s$ and $V_d$ being in the plane of the disc. The means to rotate the disc 1 in the sense $f$ are such that the apertures 2 when in their lowest position have a backwards direction and such that their corresponding speed $V_d$ has substantially the same value as the forward speed $V_s$, whereby the resultant speed V of the seed leaving the disc has a small value. Thus the seeds leave the disc without undergoing any impulsion and with an initial speed V which is relatively small and directed downwards in the plane of the disc.

Besides, as the disc 1 is rotated by the wheel 44, if the forward speed $V_s$ is increased and becomes $V_s'$, the speed of the disc becomes $V_d'$ and $V_d/V_s = V_d'/V_s'$. The direction of the geometric resultant V' thus does not depend upon the actual speed of the sowing machine. The initial speed V has always the same direction, and this is a factor in the regularity of the seed distribution.

Besides, as the seeds fall between the wings of the ploughshare 52, they do not rebound on the ploughshares. Consequently, the fall duration is not only short, as said before, but also practically constant, whatever be the nature of seed. As any rebounding on the soil is avoided, the spacing of seed on the soil is uniform. It depends only on the space of apertures 2.

The number of double seeds and of absent seeds is very small, due to the associated actions of paddles 16, 17 and of the stirrer 18.

It is clear also that by construction of the sowing machine, it is possible to give to the direction of the resultant V any convenient orientation. It is only necessary to adjust the location of point D where the depression ceases, relatively to the lowest point of the disc, and to fix the ratio $V_s/V_d$ by a convenient choice of the pinions of the chain transmission 46 from wheel 44.

For example, V may be vertical, wherefor the drop time for the seeds is as reduced as possible. If D is at the lowest point of the disc, and if $V_d = V_s$, $V = 0$. The seeds fall vertically by their own weight without initial speed.

D being always located in the vicinity of the lowest point of the disc, V has always a small value.

It is possible, with the same disc, to sow seeds of the most varied shapes, even those which differ substantially from the spherical shape.

The seed density per acre may be changed very easily by using discs comprising perforations in different numbers.

The seed distributor is light, simple and its side bulk is small.

It will be obvious that the invention is not limited to the embodiments described and that all sorts of modifications may be made thereto. Thus the contours of the walls of the feed box and depression box may be of many shapes. On the other hand, it is obvious that the distributor may be mounted on all kinds of frames and that ploughshares other that those described may be used.

What we claim is:

1. A seed sowing machine having a frame, a wheel supporting said frame for movement upon the ground and means for drawing said machine forwardly, a seed distributor mounted at the lower portion of said frame and close to the ground, said distributor comprising a vertically and rotatably mounted disc having a circular row of perforations, with the dimensions of each of said perforations being smaller than that of the seeds to be sown, means driven by said wheel for rotating said disc in a direction corresponding to that of said wheel, a seed box containing the seeds to be sown, a suction box, means for creating a suction within said suction box, said boxes being oppositely arranged, adjacent to said disc and having the same as a common wall therebetween, said boxes intercepting two arcs on said row of perforations with said arcs having a common part and the one corresponding to said suction box extending farther in the sense of rotation of said disc than the one corresponding to said seed box, and down to a drop point for said seeds in the lower part of said disc, said rotating means further being capable of rotating said disc in a manner that at said drop point the speed of said disc is substantially equal and opposed to the forward speed of said distributor.

2. A seed sowing machine having a frame, a wheel supporting said frame for movement upon the ground and means for drawing said machine forwardly, a seed distributor mounted on the lower portion of said frame and close to the ground, said distributor comprising a seed box for containing seeds to be sown, means for giving said seeds a given level within said seed box, a suction box, means for creating a suction within said suction box, a rotatably and vertically mounted disc, said disc having a circular row of perforations with an upper point and a lower point and with the dimensions of each perforation being smaller than that of the seeds to be sown, means driven by said wheel for rotating said disc in such a direction that said row of perforations moves backwardly relative to the movement of the distributor at said lower point, said boxes being positioned adjacent to and limited by said disc which forms a common wall therebetween, each of said boxes being of a configuration intercepting an arc on said row of perforations with said arcs having a common portion and the arc intercepted by said suction box extending in the direction of rotation of said disc from said seed level in said seed box up to the upper point of said row and continuing therefrom downward as far as the vicinity of said lower point on said row but before said point, said rotating means further being capable of rotating said disc in a manner that at said lower point the row of perforations moves backwardly at substantially the same rate as the distributor moves forwardly, whereby the seeds are discharged from said lower point in proximity to the ground and with a resultant speed of small value and of a constant direction regardless of the forward speed of said machine.

3. A seed sowing machine having a frame, a wheel supporting said frame for movement upon the ground and means for drawing said machine forwardly, a seed distributor mounted at the lower portion of said frame and close to the ground, said distributor comprising a vertically and rotatably mounted disc having a circular row of perforations with the dimensions of each of said perforations being smaller than that of the seeds to be sown, means driven by said wheel for rotating said disc in a direction corresponding to that of said wheel, a seed box containing the seeds to be sown, a suction box, means for creating a suction within said suction box, said boxes being oppositely arranged, adjacent to said disc and having the same as a common wall therebetween, said boxes intercepting two arcs on said row of perforations with said arcs having a common part and the one corresponding to said suction box extending farther in the sense of rotation of said disc than the one corresponding to said seed box and down to a drop point for seed seed in the lower part of said disc, said seed box having an aperture for the passage of the seeds when seated on the perforations of said disc by said suction means, means for adjusting said aperture to substantially the width of a seed, said disc rotating means further being capable of rotating said disc in a manner so that at said drop point for said seeds, the speed of said disc is substantially equal and opposed to the forward speed of said distributor.

References Cited in the file of this patent
UNITED STATES PATENTS

| | | |
|---|---|---|
| 967,644 | Kirkegaard | Aug. 16, 1910 |
| 1,046,199 | Knopp | Dec. 3, 1912 |
| 1,331,235 | Bristow | Feb. 17, 1920 |
| 1,352,411 | Hutton | Sept. 7, 1920 |
| 1,501,335 | Hartenstein | July 15, 1924 |
| 2,324,823 | Chilson et al. | July 20, 1943 |
| 2,415,577 | Bushue | Feb. 11, 1947 |
| 2,505,758 | Enebeck | May 2, 1950 |
| 2,525,718 | Parker | Oct. 10, 1950 |
| 2,737,314 | Anderson | Mar. 6, 1956 |